(12) United States Patent
Watariuchi (10) Patent No.: US 11,983,385 B2
(45) Date of Patent: May 14, 2024

(54) INFORMATION PROCESSING APPARATUS, CONTROL METHOD FOR INFORMATION PROCESSING APPARATUS, AND STORAGE MEDIUM

(71) Applicant: CANON KABUSHIKI KAISHA, Tokyo (JP)

(72) Inventor: Satoki Watariuchi, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 17/715,994

(22) Filed: Apr. 8, 2022

(65) Prior Publication Data
US 2022/0350451 A1 Nov. 3, 2022

(30) Foreign Application Priority Data
Apr. 30, 2021 (JP) .................... 2021-078147

(51) Int. Cl.
*G06F 3/048* (2013.01)
*G06F 3/01* (2006.01)
*G06F 3/0482* (2013.01)
*G06F 3/04883* (2022.01)

(52) U.S. Cl.
CPC ............ *G06F 3/0482* (2013.01); *G06F 3/017* (2013.01); *G06F 3/04883* (2013.01)

(58) Field of Classification Search
CPC ..... G06F 3/017; G06F 3/0482; G06F 3/04883
See application file for complete search history.

(56) References Cited

U.S. PATENT DOCUMENTS

| 7,844,921 B2 | 11/2010 | Ike et al. | |
| 2012/0299862 A1* | 11/2012 | Matsumoto | G06F 3/0488 345/173 |
| 2013/0016064 A1* | 1/2013 | Lee | G06F 3/044 345/174 |
| 2013/0130669 A1* | 5/2013 | Xiao | H04M 1/72457 455/418 |
| 2014/0168130 A1* | 6/2014 | Hirai | G06F 3/02 345/173 |
| 2015/0046828 A1* | 2/2015 | Desai | H04L 67/535 715/739 |
| 2015/0055173 A1 | 2/2015 | Watariuchi | |
| 2021/0112168 A1* | 4/2021 | Takatoh | H04N 1/00925 |

FOREIGN PATENT DOCUMENTS

JP 4267648 B2 5/2009

\* cited by examiner

*Primary Examiner* — Claudia Dragoescu
(74) *Attorney, Agent, or Firm* — Carter, DeLuca & Farrell LLP (57) ABSTRACT

An information processing apparatus capable of receiving a touch operation and a touchless operation includes an operation control unit configured to control an operation method by enabling any one of the touch operation and the touch operation according to the setting information related to the operation method, and the operation control unit controls the operation method according to the operation method of the detected operation of a user if the operation method cannot be determined only by the setting information.

13 Claims, 8 Drawing Sheets

| | Setting item | Set value |
|---|---|---|
| 311 | Operation mode | Automatic |
| 312 | Automatic reset time | 60sec |
| | ... | ... |

INFORMATION PROCESSING APPARATUS, CONTROL METHOD FOR INFORMATION PROCESSING APPARATUS, AND STORAGE MEDIUM

BACKGROUND OF THE INVENTION

Field of the Invention

The present invention relates to an information processing apparatus capable of a touch operation and a touchless operation, a control method for an information processing apparatus, and a storage medium.

Description of the Related Art

In recent years, there have been many information processing apparatuses having a touch panel (screen). For example, an image forming apparatus (MFP), which is a kind of information processing apparatus, is generally equipped with a touch panel. An MFP installed in an office is usually shared by multiple people. On the other hand, due to the increased sense of hygiene, there is a demand in which people do not want to touch a touch panel touched by others. In recent years, touchless technology using a hand sensor has been disclosed as a technology for operating without touching a screen. For example, Japanese Patent No. 4267648 discloses an interface device through which the operator gives instructions to a control target device by a hand shape and the like, which makes it possible for the operator to perform operations without having to memorize the gestures used for the operations in advance by displaying a list of gestures used for the operation. By installing a hand sensor in an information device, even when multiple people share the same information processing apparatus, operation is possible without touching a screen touched by others.

However, when the operation method of the shared information processing apparatus is limited only to touchless operation, the usability will be reduced. For example, if an information processing apparatus that enables only touch operation is replaced with an information processing apparatus that enables only touchless operation, the needs of users with a good sense of hygiene who do not like touch can be satisfied. However, the needs of users who want to perform the same operations as before without hesitating to touch the screen are not satisfied. On the other hand, if both touch operation and touchless operation can be used, there is a concern that both operation methods may be mixed and an erroneous operation will occur.

SUMMARY OF THE INVENTION

The present invention improves the convenience of a user operation of an information processing apparatus that supports both touch operation and touchless operation.

There is provided an information processing apparatus capable of receiving a touch operation and a touchless operation including: one or more memories that store instructions; and one or more processors configured to execute the instructions stored in the one or more memories to control whether to enable reception of either the touch operation or the touchless operation based on whether the operation received from a user is a touch operation or a touchless operation.

Further features of the present invention will become apparent from the following description of exemplary embodiments with reference to the attached drawings.

DESCRIPTION OF THE EMBODIMENTS

First Embodiment

Figure 1:
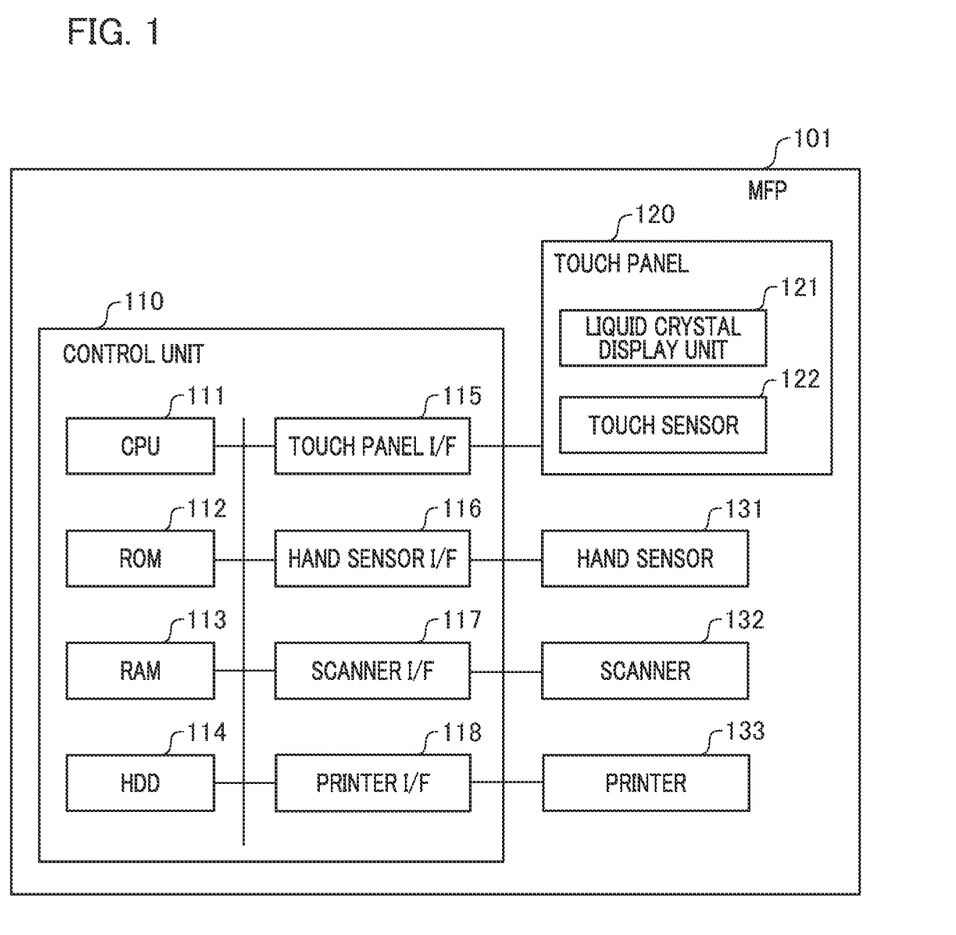
FIG. 1 is a block diagram showing a hardware configuration of an information processing apparatus.

FIG. 1 is a block diagram showing a hardware configuration of an information processing apparatus according to the present embodiment. The information processing apparatus of the present embodiment includes, for example, a touch panel and a hand sensor, and can receive a touch operation and a touchless operation of a user. In the present embodiment, a multi function peripheral (MFP) having a printing function and a scanning function will be used as an example of the information processing apparatus in the description, but the present invention is not limited to an MFP.

An MFP 101 is an image forming apparatus including a scanner 132 and a printer 133. The scanner 132 is an image input device that optically reads a document and generates an electronic file (scan data) based on the scanning. The printer 133 is an image output device that forms an image corresponding to the print data received from the outside and outputs the image to a paper sheet, or optically reads the document image set in the scanner 305 and outputs the document image to a paper sheet. The MFP 101 further includes a control unit 110, a touch panel 120, and a hand sensor 131.

The control unit 110 controls the operation of the entire MFP 101. The control unit 110 includes a CPU 111, a ROM 112, a RAM 113, an HDD 114, a touch panel I/F 115, a hand sensor I/F 116, a scanner I/F 117, and a printer I/F 118. The central processing unit (CPU) 111 executes hardware and software control processing by reading and executing the control program stored in the ROM 112 or the HDD 114. The read only memory (ROM) 112 is a non-volatile storage area and stores various data such as the basic control program and applications of the MFP 101.

The random access memory (RAM) 113 is used as a temporary storage area such as the main memory or work area in the CPU 111. The hard disk drive (HDD) 114 stores image data and various programs.

The touch panel 120 includes a liquid crystal display unit 121 that displays a screen; and a touch sensor 122 that detects information touched by the user on the screen. The touch panel I/F 115 is an interface that connects the touch panel 120 and the control unit 110. The touch panel I/F 115 outputs the data displayed on the liquid crystal display unit 121 to the touch panel 120. In addition, the touch panel I/F 115 sends information on the touch operation by the user detected by the touch sensor 122 to the CPU 111.

The hand sensor 131 detects the state of the hand or finger of the user in the space above the liquid crystal display unit 121. Examples of information detected by the hand sensor 131 include a distance between the fingertip and the liquid crystal display unit 121, the type or number of extended fingers, a left or right hand, and the movement of the hand or finger (hand gesture). The user can perform a touchless operation without touching the touch panel 120 according to the information detected by the hand sensor 131. The hand sensor I/F 116 is an interface that connects the hand sensor 131 and the control unit 110. The hand sensor I/F 116 sends the state of the hand or finger of the user detected by the hand sensor 131 to the CPU 111.

The scanner I/F 117 is an interface that connects the scanner 132 and the control unit 110. The scanner 132 reads the document to generate image data, and inputs the image data read via the scanner I/F 117 to the control unit 110. The printer I/F 118 is an interface that connects the printer 133 and the control unit 110. The image data to be printed by the printer 133 is transferred from the control unit 110 to the printer 133 via the printer I/F 118, and is printed on a recording medium such as a paper sheet by the printer 133.

Figure 2:
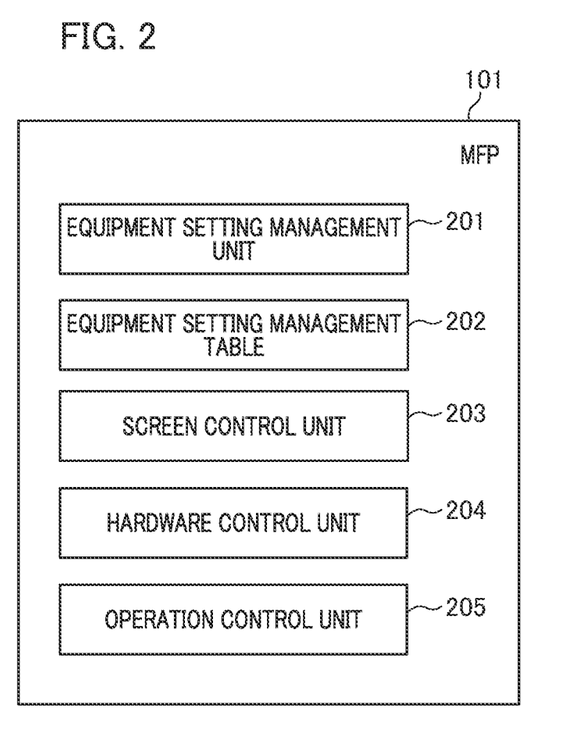
FIG. 2 is a block diagram showing a software configuration of the information processing apparatus.

FIG. 2 is a block diagram showing a software configuration of the information processing apparatus according to the present embodiment. This software configuration is realized by the CPU 111 reading the program stored in the ROM 112 or the HDD 114 of the MFP 101 to the RAM 113, analyzing the program, and executing the program, and the processing which will be described later is executed. The MFP 101 includes an equipment setting management unit 201, an equipment setting management table holding unit 202, a screen control unit 203, a hardware control unit 204, and an operation control unit 205.

The equipment setting management unit 201 manages the setting items and the values thereof that can be set in the MFP 101. For example, the equipment setting management unit 201 manages setting information related to the operation method of the user.

The equipment setting management unit 201 also manages the reset time until the operation method is reset. The equipment setting management table holding unit 202 holds the setting information managed by the equipment setting management unit 201 as an equipment setting management table. The equipment setting management table is recorded in the RAM 113 or the HDD 114. An example of the equipment setting management table held by the equipment setting management table holding unit 202 will be described later in FIG. 3.

The screen control unit 203 controls the screen displayed on the liquid crystal display unit 121. Examples of screens displayed on the liquid crystal display unit 121 will be described later in FIGS. 4A and 4B. The hardware control unit 204 controls the hardware of the MFP 101, such as the touch panel 120, the hand sensor 131, the scanner 132, and the printer 133, via each I/F. The operation control unit 205 controls the operation method (operation mode) of the user received by the MFP 101. The operation control unit 205 determines the operation method of the user received by the MFP 101 according to the operation mode set in the equipment setting management table. If the operation mode defined in the equipment setting management table is "automatic", the operation control unit 205 determines the operation method according to the operation by the user.

Figure 3:
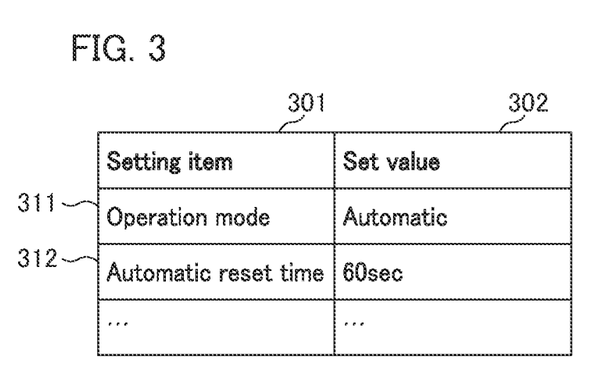
FIG. 3 shows an example of an equipment setting management table.

FIG. 3 shows an example of the equipment setting management table. The equipment setting management table is managed by the equipment setting management unit 201 and is held by the equipment setting management table holding unit 202. In the equipment setting management table, one line (1 record) is the definition of one setting, and the combinations of setting items and the set values thereof are defined in each line. A setting item 301 is a column representing the setting item. A set value 302 is a column that defines the set value for the setting item. The equipment setting management table of the present embodiment includes an operation mode setting that defines the operation method of the user and an automatic reset time setting that defines the time until the operation mode is reset.

In an operation mode 311, the setting item 301 is set to "operation mode" and the set value 302 is set to "automatic". The operation mode is a setting item that determines the operation method of the MFP 101. There are three types of set values 302 that can be set in the operation mode: "touch", "touchless", and "automatic". When the set value 302 is "touch", the MFP 101 enables only the touch operation of the user. When the set value 302 is "touchless", the MFP 101 enables only the touchless operation of the user. When the set value 302 is "automatic", the operation method to be used on the subsequent screens is determined according to the operation performed by the user at the start of the operation of the MFP 101. In other words, if the user performs a touch operation at the start of the operation of the MFP 101, only the touch operation of the user is enabled even in the operation method used on the subsequent screens. Meanwhile, if the user performs a touchless operation at the start of the operation of the MFP 101, only the touchless operation of the user is enabled even in the operation method used on the subsequent screens.

An automatic reset time 312 is a setting in which the setting item 301 is set to "automatic reset time" and the set value 302 is set to "60 sec". The automatic reset time is a setting item that determines a predetermined time until the automatic reset of the operation method is performed. The automatic reset is a function of automatically returning to the state when the MFP 101 is started if no operation is performed for a predetermined time or more after the user finishes the operation of the MFP 101. The set value 302 that can be set for the automatic reset time is any arbitrary time. If "60 sec" is set for the set value 302, and if no operation is performed for 60 seconds after the user finishes the operation of the MFP 101, the setting of the operation method of the MFP 101 is reset (initialized). For example, if the operation mode is set to "automatic", the operation method set to the touch operation or the touchless operation is reset by automatic resetting, and the operation method of the user that is enabled is determined according to the operation that the user first performs after the automatic reset.

Figure 4A:
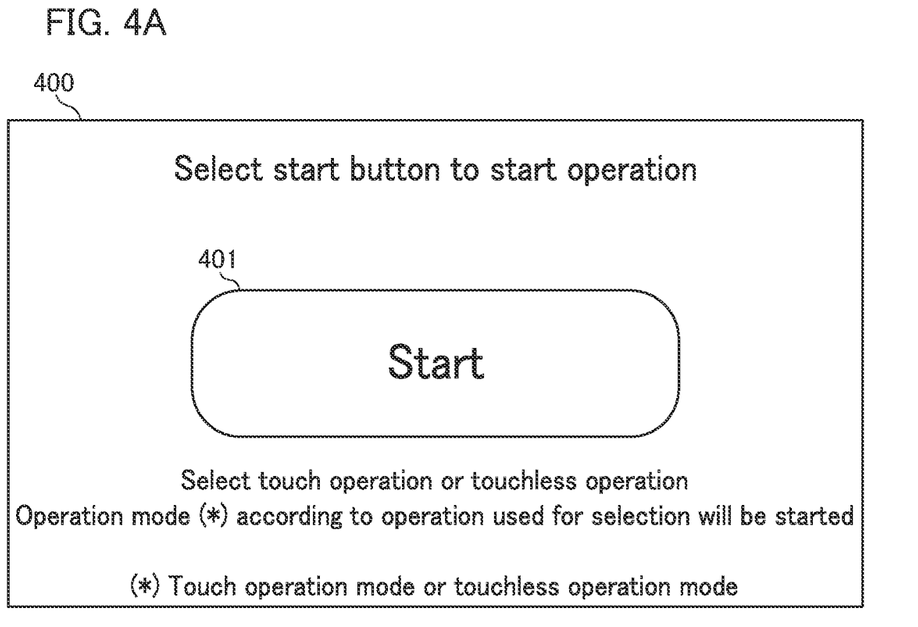
FIGS. 4A and 4B are views showing examples of an operation method selection screen.
Figure 4B:
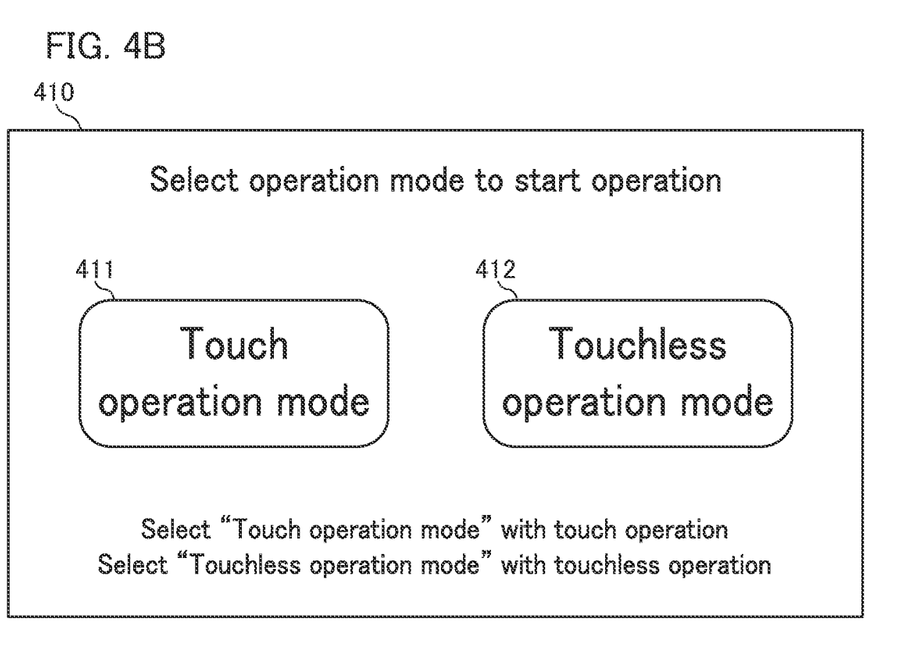

FIGS. 4A and 4B are views showing examples of an operation method selection screen of the MFP 101. The operation method selection screen is a screen displayed on the liquid crystal display unit 121 when the MFP 101 is started if the operation mode is set to "automatic". Two examples in FIG. 4A and FIG. 4B are described as examples of the operation method selection screen. The operation method to be received thereafter is determined according to the operation performed by the user on the operation method selection screen.

FIG. 4A is an example of a case where one icon is displayed on the operation method selection screen. An operation method selection screen 400 has an icon 401. The icon 401 supports both touch operation and touchless operation. The user can also select the icon 401 by the touch operation or by the touchless operation. If the user selects the icon 401 by the touch operation, only the touch operation is enabled on the subsequent screens. On the other hand, if the user selects the icon 401 by the touchless operation, only the touchless operation is enabled on the subsequent screens.

FIG. 4B is an example of a case where two icons are displayed on the operation method selection screen. An operation method selection screen 410 has two icons, that is, an icon 411 that supports the touch operation and an icon 412 that supports to the touchless operation. The icon 411 and the icon 412 are icons for selecting the operation method to be used on the subsequent screens. The icon 411 is an icon for selecting a touch operation, and the icon 412 is an icon for selecting a touchless operation. In addition, a specification is applied in which the operation method for selecting each icon is determined, the icon 411 can be selected only by the touch operation, and the icon 412 can be selected only by the touchless operation. In this manner, by limiting the operation method for selecting each icon, the possibility that the user makes an erroneous selection is suppressed. If the user selects the icon 411 by the touch operation, only the touch operation is enabled on the subsequent screens. On the other hand, if the user selects the icon 412 by the touchless operation, only the touchless operation is enabled on the subsequent screens.

Figure 5:
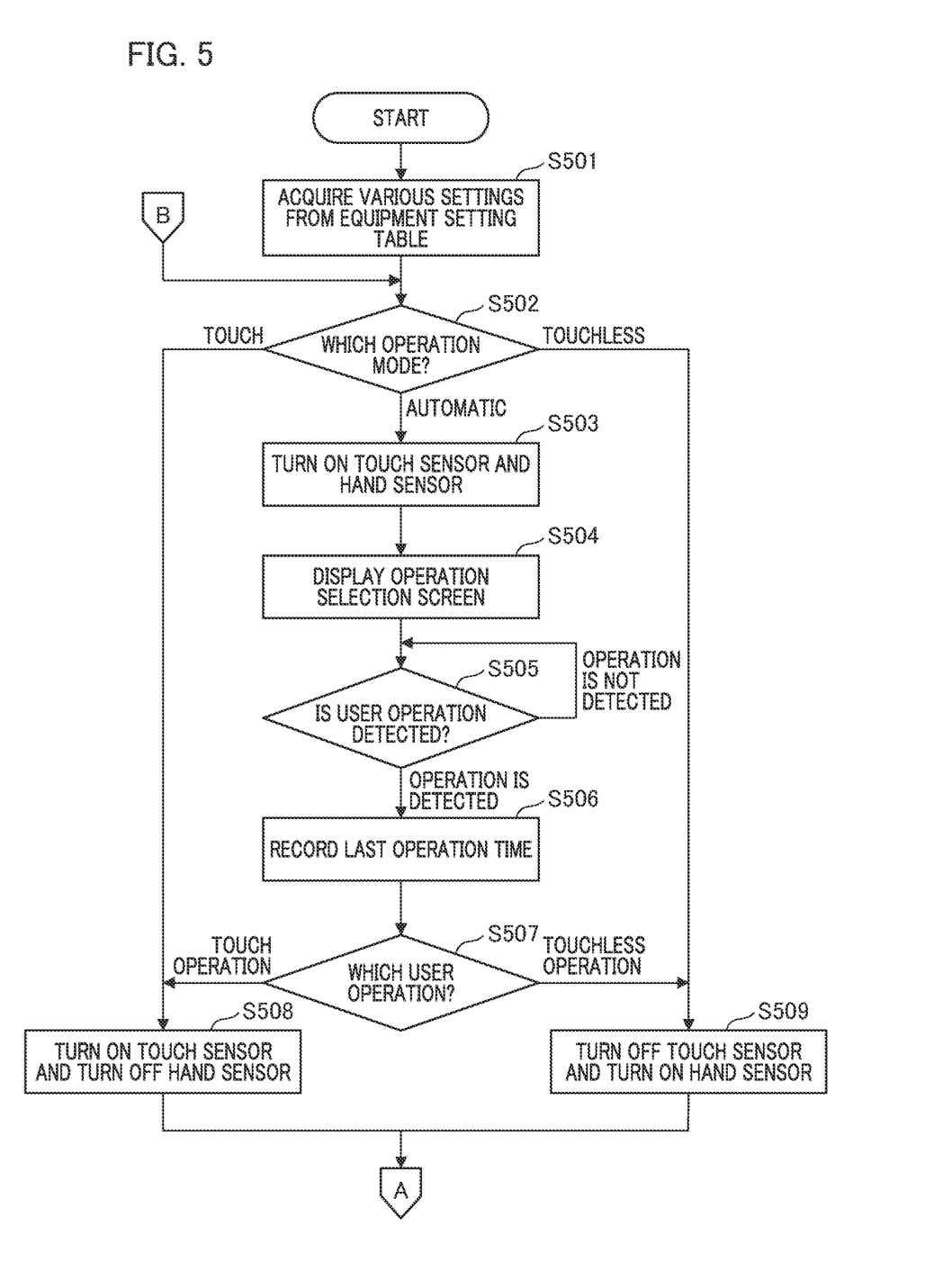
FIG. 5 is a flowchart showing processing of an MFP according to a first embodiment.
Figure 6:
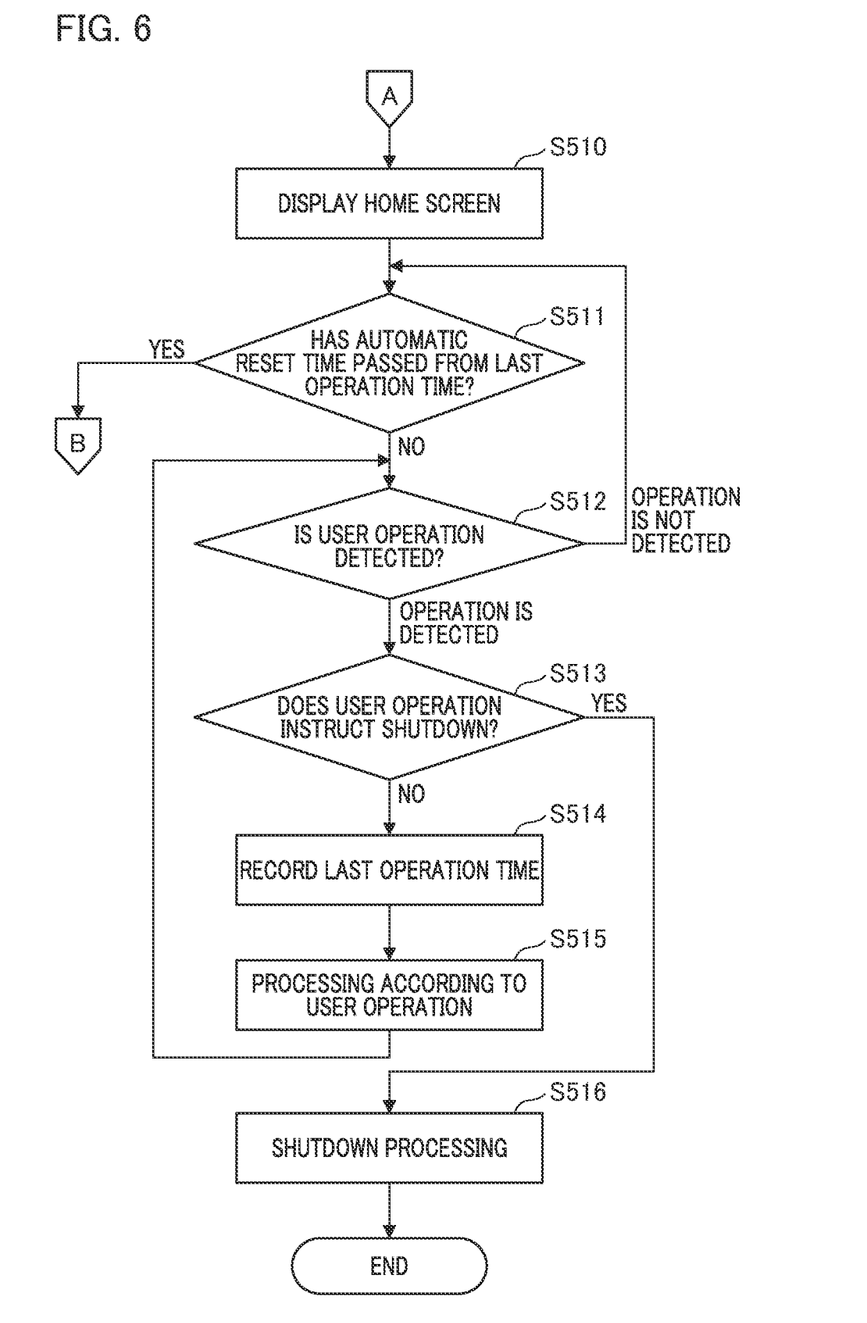
FIG. 6 is a flowchart showing processing of the MFP according to the first embodiment.

FIGS. 5 and 6 are flowcharts showing processing of the MFP 101 according to the first embodiment. This flow is started when the MFP 101 is started. Each processing shown in FIGS. 5 and 6 is realized by the CPU 111 reading the program stored in the HDD 114 of the MFP 101 into the RAM 113, analyzing the program, and executing the program.

In step S501, the operation control unit 205 acquires each set value of the operation mode 311 and the automatic reset time 312 defined in the equipment setting management table held by the equipment setting management table holding unit 202. In step S502, the operation control unit 205 determines whether the set value of the operation mode 311 is "touch", "touchless", or "automatic". The operation control unit 205 branches the subsequent processing according to the set value of the operation mode 311. If the set value of the operation mode 311 is "touch", the process proceeds to step S508. If the set value is "touchless", the process proceeds to step S509. If the set value is "automatic", the process proceeds to step S503. As shown in step S501 and step S502, in the present embodiment, the operation method is first determined according to the setting information defined in the equipment setting management table. If the operation method is "automatic", that is, if the operation method cannot be determined only by the setting information, the process proceeds to step S503, and a series of processing for determining the operation method according to the operation of the user is performed.

When the set value is "automatic", the hardware control unit 204 enables the touch sensor 122 and the hand sensor 131 in step S503. Since both the touch sensor 122 and the hand sensor 131 are enabled, both touch operation and touchless operation by the user can be detected. In step S504, the screen control unit 203 displays the operation method selection screen on the liquid crystal display unit 121. The screen control unit 203 displays, for example, the operation method selection screen 400 in FIG. 4A or the operation method selection screen 410 in FIG. 4B on the liquid crystal display unit 121 as an operation method selection screen, and prompts the user to operate.

In step S505, the hardware control unit 204 waits for the operation of the user with respect to the touch sensor 122 or the hand sensor 131, and determines whether or not the operation of the user has been detected. When the hardware control unit 204 detects the operation of the user, the process proceeds to step S506. On the other hand, if the operation of the user cannot be detected, this step is repeated. The operation of the user detected in step S505 is the operation that the user first performed after starting the MFP 101. In other words, the operation is the operation at the start of the operation. In step S506, the operation control unit 205 records the current system time as the "last operation time" in the RAM 113 or the HDD 114.

In step S507, the operation control unit 205 determines whether the operation of the user at the start of the operation detected in step S505 was a touch operation or a touchless operation. If the detected user operation is a touch operation with respect to the touch sensor 122, the process proceeds to step S508. Meanwhile, if the detected user operation is a touchless operation with respect to the hand sensor 131, the process proceeds to step S509. In this manner, if the operation method cannot be determined only by the operation mode defined in the equipment setting management table (if the operation mode is "automatic"), processing in step S503 to step S507 is performed, and accordingly, it is possible to determine the operation method according to the user operation.

Step S508 is processing that is executed if the operation mode is "touch" or if the operation mode is "automatic" and the operation of the user on the operation method selection screen is a touch operation. In step S508, the operation control unit 205 instructs the hardware control unit 204 to enable the touch sensor 122 and disable the hand sensor 131. By turning on the touch sensor 122 and turning off the hand sensor 131, only the touch operation by the user will be detected in the subsequent steps, and the touchless operation will not be detected.

Step S509 is processing that is executed if the operation mode is "touchless" or if the operation mode is "automatic" and the operation of the user on the operation method selection screen is a touchless operation. In step S509, the operation control unit 205 instructs the hardware control unit 204 to disable the touch sensor 122 and enable the hand sensor 131. By turning on the hand sensor 131 and turning off the touch sensor 122, only the touchless operation by the user is detected in the subsequent steps, and the touch operation is not detected.

In step S510, the screen control unit 203 displays a home screen on the liquid crystal display unit 121. The home screen is a screen on which icons for calling the functions or applications of the MFP 101 are lined up.

In step S511, the operation control unit 205 acquires the elapsed time from the last operation in step S501, and determines whether or not a predetermined time (automatic reset time) for resetting the operation method has passed. Specifically, the operation control unit 205 first calculates the elapsed time since the user last operated the MFP 101 by the difference between the current system time and the recorded last operation time. Then, the operation control unit 205 compares the calculated elapsed time with the set value of the automatic reset time 312, and determines whether or not the elapsed time has elapsed the set value of the automatic reset time 312. If the elapsed time has reached the automatic reset time, the process proceeds to step S502, and the operation mode is reset (initialized). If the operation mode is reset, the processing of determining the operation mode is performed again in step S502 to step S509. If the operation mode is "automatic", in steps S505 to step S507 after reset, it is determined whether to enable either the touch operation or the touchless operation according to the user operation detected first after reset. On the other hand, if the elapsed time has not passed the automatic reset time, the process proceeds to step S512.

In step S512, the hardware control unit 204 waits for a user operation on the screen displayed on the liquid crystal display unit 121. When the hardware control unit 204 detects a user operation, the process proceeds to step S513, and if the user operation is not detected, the process returns to step S511.

In step S513, the hardware control unit 204 determines whether or not the operation by the user detected in step S512 instructs a shutdown. If the hardware control unit 204 determines that the operation by the user is a shutdown instruction, the process proceeds to step S516. Meanwhile, if the hardware control unit 204 determines that the operation by the user is not a shutdown instruction, the process proceeds to step S514.

In step S514, the operation control unit 205 records the current system time as the "last operation time" in the RAM 113 or the HDD 114. In step S515, the hardware control unit 204 performs various processing according to the operation by the user detected in step S512. For example, if the user performs an operation to select an application on the home screen, the hardware control unit 204 starts the selected application. If the user gives a print instruction, the hardware control unit 204 performs printing processing using the printer 133. The hardware control unit 204 returns to step S512 after performing processing according to the operation by the user, and waits for a new user operation. After performing the processing according to the operation by the user, if there is no new operation from the user until the automatic reset time elapses (NO in step S512, YES in step S511), the set operation mode is initialized, and the process returns to step S502. In step S516, the hardware control unit 204 performs shutdown processing for turning off the power source of the MFP 101, and ends this flow.

As described above, according to the present embodiment, in the information processing apparatus that supports both touch operation and touchless operation, it is possible to control to receive only one of the touch operation and the touchless operation according to the operation by the user. Accordingly, each user can operate the shared information processing apparatus by the preferred operation method, and can suppress an erroneous operation due to the operation method not selected, which improves the convenience of the user.

Second Embodiment

In the first embodiment, as a method of disabling one of the touch operation and the touchless operation, processing of disabling the touch sensor 122 or the hand sensor 131, which is hardware, is performed. However, depending on the type of sensor (touch sensor 122, hand sensor 131), a case where the sensor cannot be disabled is considered. Therefore, in the second embodiment, as a method of disabling one of the touch operation and the touchless operation, an embodiment in which the input of the touch sensor 122 or the hand sensor 131 is ignored in the software will be described. In the second embodiment, only the difference from the first embodiment will be described.

Figure 7:
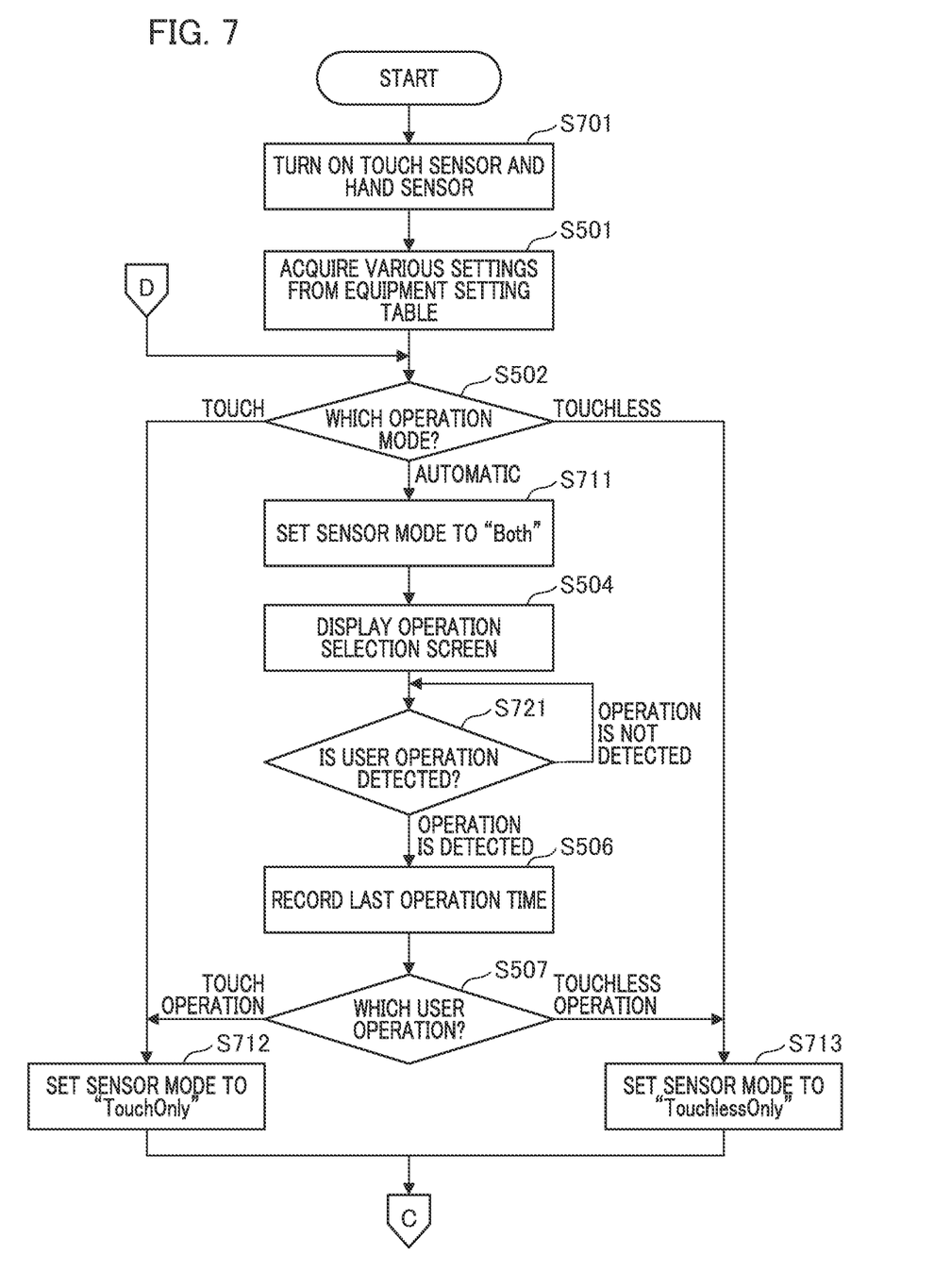
FIG. 7 is a flowchart showing processing of an MFP according to a second embodiment.
Figure 8:
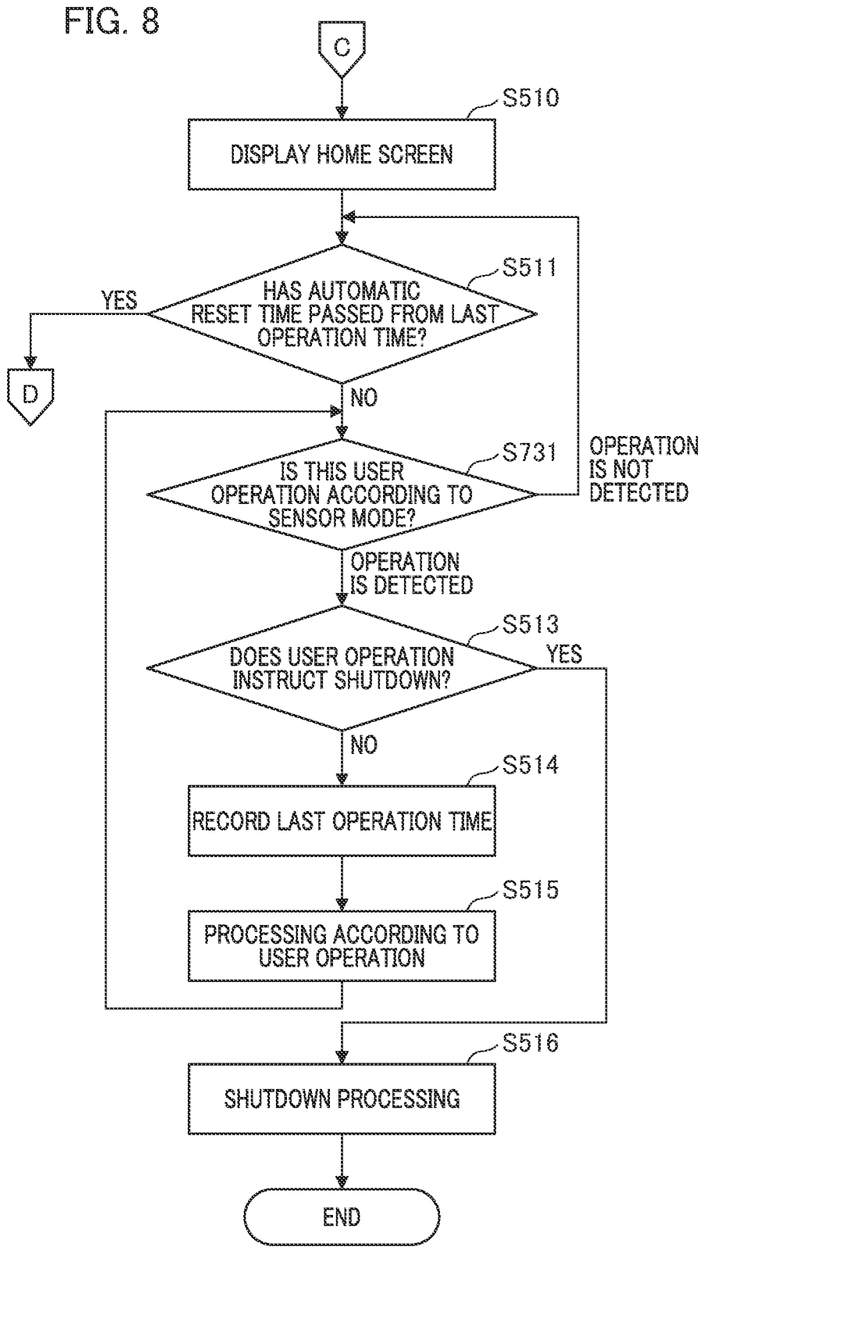
FIG. 8 is a flowchart showing processing of the MFP according to the second embodiment.

FIGS. 7 and 8 are flowcharts showing processing of the MFP 101 according to the second embodiment. This flow is started when the MFP 101 is started. Each processing shown in FIGS. 7 and 8 is realized by the CPU 111 reading the program stored in the HDD 114 of the MFP 101 into the RAM 113, analyzing the program, and executing the program. FIGS. 7 and 8 are flowcharts obtained by modifying FIGS. 5 and 6 of the first embodiment, and the differences from FIGS. 5 and 6 will be described below.

In step S701, the hardware control unit 204 enables both the touch sensor 122 and the hand sensor 131.

In step S502, the operation control unit 205 determines whether the set value of the operation mode 311 is "touch", "touchless", or "automatic". The operation control unit 205 branches the subsequent processing according to the set value of the operation mode 311. If the set value of the operation mode 311 is "touch", the process proceeds to step S712. If the set value is "touchless", the process proceeds to step S713. If the set value is "automatic", the process proceeds to step S711.

In step S711, the operation control unit 205 records the sensor mode as "Both" in the RAM 113 or the HDD 114. Here, the sensor mode determines how to handle the information received from each sensor of the touch sensor 122 and the hand sensor 131. In addition to "Both", there are "TouchOnly" and "TouchlessOnly" in the sensor mode. "Both" is a mode that enables both touch operation and touchless operation. "TouchOnly" is a mode that enables the touch operation and disables the touchless operation. "TouchlessOnly" is a mode that enables the touchless operation and disables the touch operation. The details of the processing according to the sensor mode will be described later using the flowchart shown in FIG. 9. The operation control unit 205 sets the sensor mode to "Both" and then the process proceeds to the step S504. In step S504, the screen control unit 203 displays the operation method selection screen on the liquid crystal display unit 121, and the process proceeds to step S721.

In step S721, the hardware control unit 204 waits for the operation of the user with respect to the touch sensor 122 or the hand sensor 131, and determines whether or not the operation of the user with respect to any of the sensors has been detected. When the hardware control unit 204 detects the operation of the user, the process proceeds to step S506. On the other hand, if the operation of the user cannot be detected, this step is repeated.

In step S507, the operation control unit 205 determines whether the operation of the user detected in step S721 was a touch operation or a touchless operation. If the detected user operation is a touch operation with respect to the touch sensor 122, the process proceeds to step S712.

Meanwhile, if the detected user operation is a touchless operation with respect to the hand sensor 131, the process proceeds to step S713.

In step S712, the operation control unit 205 records the sensor mode as "TouchOnly" in the RAM 113 or the HDD 114. By setting the sensor mode to "TouchOnly", the touchless operation detected by the hand sensor 131 is disabled, and only the touch operation detected by the touch sensor 122 is enabled.

In step S712, the operation control unit 205 records the sensor mode as "TouchlessOnly" in the RAM 113 or the HDD 114. By setting the sensor mode to "TouchlessOnly", the touch operation detected by the touch sensor 122 is disabled, and only the touchless operation detected by the hand sensor 131 is enabled.

In step S731, the hardware control unit 204 waits for the operation of the user, and the operation control unit 205 determines whether or not the operation of the user according to the sensor mode is detected. In the first embodiment, since either the touch sensor 122 or the hand sensor 131 is disabled according to the set value of the operation mode 311 and the user operation when the operation selection screen is displayed, it was possible to detect only the operation with respect to the non-disabled sensor. In the second embodiment, the detection processing of the user operation according to the sensor mode is performed while the touch sensor 122 and the hand sensor 131 are enabled. If the operation of the user is detected in step S731, the details of the processing of determining whether or not the operation is an operation according to the sensor mode will be described using the flowchart of FIG. 9.

Figure 9:
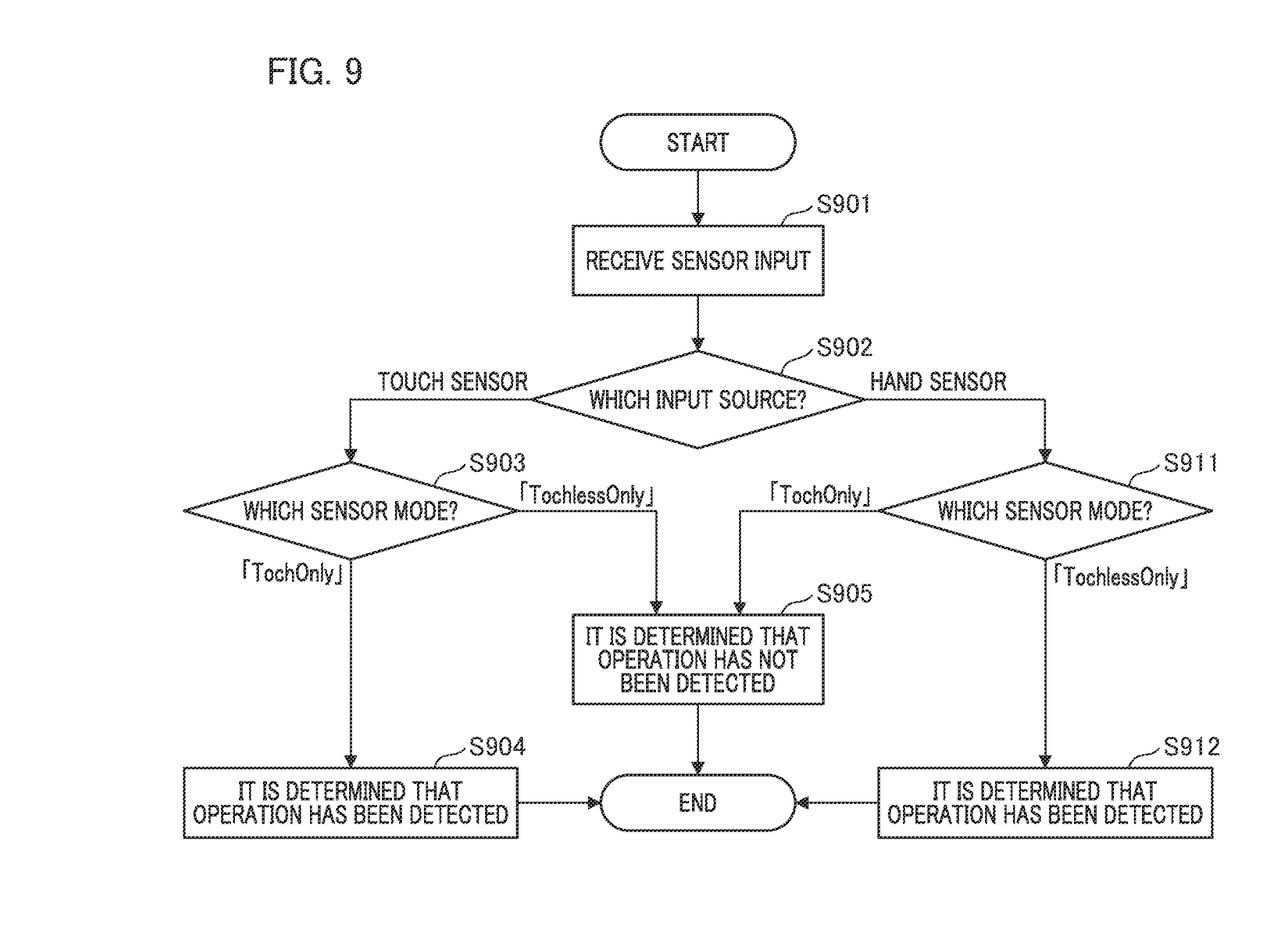
FIG. 9 is a flowchart showing detection processing of a user operation according to the second embodiment.

FIG. 9 is a flowchart showing detection processing of a user operation according to the second embodiment. This processing is started when the touch sensor 122 or the hand sensor 131 detects the operation by the user. In step S901, the hardware control unit 204 receives the sensor input from the touch sensor 122 that detects the touch operation or the hand sensor 131 that detects the touchless operation.

In step S902, the operation control unit 205 determines whether the sensor input received by the hardware control unit 204 in step S901 is an input from either the touch sensor 122 or the hand sensor 131. If the operation control unit 205 determines that the input source is the touch sensor 122, the process proceeds to step S903. On the other hand, if the operation control unit 205 determines that the input source is the hand sensor 131, the process proceeds to the step S911.

If the input from the touch sensor 122 is received, that is, if the user performs the touch operation, the operation control unit 205 determines the currently set sensor mode in step S903. If the operation control unit 205 determines that the sensor mode is "TouchOnly", the process proceeds to step S904. On the other hand, if the operation control unit 205 determines that the sensor mode is "TouchlessOnly", the process proceeds to step S905. In step S904, the operation control unit 205 determines that the operation according to the sensor mode has been detected. If an operation according to the sensor mode is detected, the process proceeds to step S513. On the other hand, in step S905, the operation control unit 205 determines that the operation according to the sensor mode has not been detected. If the operation according to the sensor mode has not been detected, the process returns to step S511. In other words, if the sensor mode is "TouchlessOnly", even when there is an input from the touch sensor 122, this case will be ignored.

If the input from the hand sensor 131 is received, that is, if the user performs the touchless operation, the hardware control unit 204 determines the currently set sensor mode in step S911. If the hardware control unit 204 determines that the sensor mode is "TouchlessOnly", the process proceeds to step S912. Meanwhile, if the hardware control unit 204 determines that the sensor mode is "TouchOnly", the process proceeds to step S905.

In step S912, the operation control unit 205 determines that the operation according to the sensor mode has been detected. If an operation according to the sensor mode is detected, the process proceeds to step S513. On the other hand, in step S905, the operation control unit 205 determines that the operation according to the sensor mode has not been detected. If the operation according to the sensor mode has not been detected, the process returns to step S511. In other words, if the sensor mode is "TouchOnly", even when there is an input from the hand sensor 131, this case will be ignored.

If it is determined that the operation of the user according to the sensor mode is detected in step S731, the process proceeds to step S513. On the other hand, if the operation by the user is not detected, or if it is determined that the operation by the user is not an operation according to the sensor mode, the process returns to step S511.

As described above, according to the procedure described in the present embodiment, even when the information processing apparatus has a sensor that cannot be disabled in terms of hardware, it is possible to control to receive only one of the touch operation and the touchless operation according to the operation by the user. Accordingly, each user can operate the shared information processing apparatus by the preferred operation method, and can suppress an erroneous operation due to the operation method not selected, which improves the convenience of the user.

OTHER EMBODIMENTS

Embodiments of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiments and/or that includes one or more circuits (e.g., application specific integrated circuit (ASIC)) for performing the functions of one or more of the above-described embodiments, and by a method performed by the computer of the system or apparatus by, for example, reading out and executing the computer executable instructions from the storage medium to perform the functions of one or more of the above-described embodiments and/or controlling the one or more circuits to perform the functions of one or more of the above-described embodiments. The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2021-078147, filed Apr. 30, 2021, which is hereby incorporated by reference herein in its entirety.

What is claimed is:

1. An information processing apparatus capable of receiving a touch operation and a touchless operation comprising:
   one or more memories that store instructions; and
   one or more processors configured to execute the instructions stored in the one or more memories to;
   cause a display unit of the information processing apparatus to display a content screen including a display content for selecting either a touch mode in which a touch operation is enabled and a touchless operation is disabled, or a touchless mode in which a touch operation is disabled and a touchless operation is enabled;

operate the information processing apparatus in the touch mode in which the touch operation, which is a user operation performed on the display content, is enabled based on a user operation performed on a display content in the content screen being the touch operation; and operate the information processing apparatus in the touchless mode in which the touchless operation, which is a user operation performed on the display content, is enabled based on a user operation performed on a display content in the content screen being the touchless operation.

2. The information processing apparatus according to claim 1,
wherein, in a case in which the information processing apparatus operates in the touchless mode, a first sensor that detects the touch operation is disabled, and a second sensor that detects the touchless operation is enabled, and
wherein, in a case in which the information processing apparatus operates in the touch mode, the first sensor is enabled and the second sensor is disabled.

3. The information processing apparatus according to claim 1,
wherein a content displayed on the content screen is a touchless content that receives only a touchless operation, and
wherein, in a case in which the user operation performed on the touchless content is a touch operation, the touchless content is not selected, and
wherein, in a case in which the user operation performed on the touchless content is a touchless operation, the touchless content is selected, whereby the information processing apparatus operates in the touchless mode.

4. The information processing apparatus according to claim 1,
wherein a content displayed on the content screen is a touch content that receives only a touch operation, and
wherein, in a case in which the user operation performed on the touch content is a touchless operation, the touch content is not selected, and
wherein, in a case in which the user operation performed on the touch content is a touch operation, the touch content is selected, whereby the information processing apparatus operates in the touch mode.

5. The information processing apparatus according to claim 2, wherein
if there has been no operation from the user for a predetermined time, both the first and second sensors are enabled.

6. The information processing apparatus according to claim 1, wherein when either the touch mode or the touchless mode is selected on the contents screen, a home screen, which is a screen for selecting an application, is displayed based on the touch mode.

7. The information processing apparatus according to claim 1, wherein the information processing apparatus is a printer.

8. The information processing apparatus according to claim 1, wherein
the reception of both the touch operation and the touchless operation is enabled until the operation of the user is received.

9. The information processing apparatus according to claim 1, wherein
the touchless operation is a hand gesture operation.

10. The information processing apparatus according to claim 1, wherein
the touch operation is an operation that causes an indicator to touch an operation panel of the information processing apparatus.

11. The information processing apparatus according to claim 1, wherein
the touchless operation is an operation for operating the information processing apparatus without an indicator touching an operation panel of the information processing apparatus.

12. A control method for an information processing apparatus capable of a touch operation and a touchless operation, the method comprising:
displaying, on a display unit of the information processing apparatus, a content screen including a display content for selecting either a touch mode in which a touch operation is enabled and a touchless operation is disabled, or a touchless mode in which a touch operation is disabled and a touchless operation is enabled;
operating the information processing apparatus in the touch mode in which the touch operation, which is a user operation performed on the display content, is enabled disabled based on a user operation performed on a display content in the content screen being the touch operation; and
operating the information processing apparatus in the touchless mode in which the touchless operation, which is a user operation performed on the display content, is enabled based on a user operation performed on a display content in the content screen being the touchless operation.

13. A non-transitory storage medium that stores a program that causes a computer to execute a control method of an information processing apparatus capable of a touch operation and a touchless operation, the method comprising:
displaying, on a display unit of the information processing apparatus, a content screen including a display content for selecting either a touch mode in which a touch operation is enabled and a touchless operation is disabled, or a touchless mode in which a touch operation is disabled and a touchless operation is enabled;
operating the information processing apparatus in the touch mode in which the touch operation, which is a user operation performed on the display content, is enabled disabled based on a user operation performed on a display content in the content screen being the touch operation; and
operating the information processing apparatus in the touchless mode in which the touchless operation, which is a user operation performed on the display content, is enabled based on a user operation performed on a display content in the content screen being the touchless operation.

* * * * *